United States Patent [19]

Craver et al.

[11] Patent Number: 4,719,503

[45] Date of Patent: Jan. 12, 1988

[54] DISPLAY PROCESSOR WITH COLOR MATRIXING CIRCUITRY AND TWO MAP MEMORIES STORING CHROMINANCE-ONLY DATA

[75] Inventors: Thomas R. Craver, Cranbury; James H. Arbeiter, Hopewell, both of N.J.

[73] Assignee: RCA Corporation, Princeton, N.J.

[21] Appl. No.: 918,565

[22] Filed: Oct. 14, 1986

[30] Foreign Application Priority Data

Jun. 18, 1986 [GB] United Kingdom .................. 861877

[51] Int. Cl.[4] ...................... H04N 11/12; G09G 1/28

[52] U.S. Cl. ........................................ 358/12; 358/13; 340/703

[58] Field of Search .................... 340/703; 358/12, 13, 358/21 R

[56] References Cited

U.S. PATENT DOCUMENTS

| | | | |
|---|---|---|---|
| 2,854,504 | 9/1958 | Lawrence | 358/50 |
| 2,920,131 | 1/1960 | Valensi | 358/13 |
| 4,183,046 | 1/1980 | Dalke et al. | 358/22 |
| 4,336,345 | 5/1983 | Narveson et al. | 340/703 |
| 4,580,134 | 4/1986 | Campbell et al. | 340/703 |
| 4,584,597 | 4/1986 | Guichard | 358/12 |

FOREIGN PATENT DOCUMENTS

| | | | |
|---|---|---|---|
| 222093 | 10/1957 | Australia | 358/12 |

OTHER PUBLICATIONS

Color Television Standards by Donald G. Fink, pp. 213-216.

*Primary Examiner*—John W. Shepperd
*Attorney, Agent, or Firm*—E. M. Whitacre; P. J. Rasmussen; E. P. Herrmann

[57] ABSTRACT

A display processor using first and second chrominance map memories for storing values of first and second color-difference signals, each normalized respective to luminance signal. An image memory supplies, at pixel scan rate, data used to provide read-addresses to said first and second chrominance map memories and data used to describe the luminance signal. The first and second chrominance map memory read-outs are each multiplied by the luminance signal of appropriate spatial bandwidth to generate descriptions of the first and second color-difference signals i non-normalized form. These first and second color-difference signals and a full-spatial-bandwidth luminance signal are supplied to color matrixing circuitry. The color matrixing circuitry responds to these signals to provide red, green and blue drive signals to display apparatus. The display apparatus may comprise video amplifiers for the drive signals and a color kinescope, by way of example.

11 Claims, 5 Drawing Figures

DISPLAY PROCESSOR WITH COLOR MATRIXING CIRCUITRY AND TWO MAP MEMORIES STORING CHROMINANCE-ONLY DATA

The disclosure relates to video display processors used for converting digital pixel data to signals for application to color display apparatus.

BACKGROUND OF THE INVENTION

G. W. Dalke and M. D. Buchanan in their U.S. Pat. No. 4,183,046 issued Jan. 8, 1980 and entitled "ELECTRONIC APPARATUS FOR CONVERTING IMAGE OR GRAPHICS DATA TO COLOR VIDEO DISPLAY FORMATS AND METHOD THEREOF" describe a digital video color generation system for converting image or graphics data into a color video display format. In their system, image or graphics data are transformed into a succession of data words. Each data word comprises three separate groups of data bits which define the video display to be produced in terms of intensity, hue and color saturation characteristics. Such data bit groups are stored in respectively corresponding fields in a memory to allow independent user control of one or more of such color characteristics. The data bit groups corresponding to hue and saturation are employed for simultaneously addressing storage locations in three color map memories which contain digital color reference data representing symmetrically mapped combinations of hue and saturation values. The data in these storage locations are read out as digital inputs to respective multiplying digital-to-analog converters for producing red, blue and green color signals. The group of data bits corresponding to the luminance of a picture element (or "pixel") are directly converted to an analog luminance, or Y, signal which controls the reference voltage input of each of the multiplying digital-to-analog converters. This is done in a manner which modulates the magnitude of each of the video signals, to permit varying the display luminance without also altering either the hue or color saturation.

Dalke and Buchanan describe a display processor in which three color map memories are used for storing data comprising red (R), green (G) and blue (B) color signals each normalized respective to the luminance signal. This data is recovered and multiplied by the luminance signal to generate red, green and blue color video signals. The normalization of R, G and B color signals with regard to luminance reduces the number of values of them that have to be stored in the color map memories in order to describe color space or a portion thereof with desired color resolution at all luminance levels. So, the number of bit places in the color map memory addresses can be reduced accordingly. This reduces the total size of the color map memories. Dalke and Buchanan, then, describe a "multiplicative" system of describing color space in terms of three "multiplicand" color signals (normalized R, normalized G and normalized B) and a single "multiplier" luminance signal (Y), which system requires three color map memories.

In broadcast color television systems which employ analog signals an "additive" system of describing color space is used. Color space is described in terms of a luminance signal (Y) and two orthogonal color-difference signals. A color difference signal is derived by subtracting the luminance signal Y from a particular color signal. This particular color signal can describe the intensity of an additive primary color such as R or B, as is the case with R-Y and B-Y color difference signals. Alternatively this particular color signal may describe the intensity of a complex color formed by a linear combination of additive primary colors, as is the case with the I and Q color-difference signals employed in NTSC broadcast color television. For a more complete background concerning the subject of color differences the reader is referred to D. L. MacAdam's book COLOR MEASUREMENT; THEME AND VARIATIONS published in 1981 by Springer-Verlag, Berlin, Heidelberg, N.Y., especially chapter 8 entitled "Color Differences". (R-Y) and (B-Y) color-difference signals are used in European broadcast color television, and a pair of color-difference signals I (along a cyan-orange axis in the CIE chromaticity diagram) and Q (along a green-magenta axis in the CIE chromaticity diagram) are used in North American and Japanese broadcast color television. "Additive" systems describing color space are favored in broadcast practice because they allow one to conserve signal bandwidth. Relying on the fact that acuity for chrominance variation is less acute than for luminance variation in the human visual system, chrominance is transmitted with less spatial resolution than luminance.

A "multiplicative/additive" system of describing color space is employed when color mapping in accordance with the present invention. Color or color-difference signals normalized respective to luminance are supplied from respective map memories as multiplicands, which are multiplied by a luminance signal multiplier in arithmetic processes that generate color-difference signals free of normalization respective to luminance. This multiplicative procedure is followed by the linear combination of these color-difference signals with the luminance signal in color matrixing circuitry, for generating color signals to drive a color display apparatus. Certain multiplicative/additive systems can reduce the number of map memories needed to generate a polychromatic display from three to two, saving memory over the Dalke and Buchanan color mapping scheme. The multiplicative/additive system also permits the map memories used to generate such a polychromatic display to be operated using a narrower spatial bandwidth than is otherwise used for luminance without introduction of objectionable aliasing terms. This is not possible with a multiplicative system of describing color space as used by Dalke and Buchanan.

Normalization of chrominance respective to luminance obviates problems of luminance/chrominance tracking. The descriptions of luminosity and chromaticity become truly separable. This facilitates non-linear coding of luminance being carried ou independently of chrominance processing, non-linear coding of chrominance being carried out independently of luminance processing, or both. A digital representation of chrominance which is not normalized respective to luminance tends to have excessive quantizing error at lower luminance levels. Digital chrominance normalized respective to luminance has the same relative quantizing error at all luminance levels. This provides a better approximation to the chromaticity resolution requirements of human vision. The constant relative quantizing error in chrominance at all luminance levels facilitates the non-linear processing of luminance without the risk of attendant dilution of chrominance resolution.

SUMMARY OF THE INVENTION

A display processor embodying the invention includes first and second map memories for storing values of a first chrominance-only color component and for storing values of a second chrominance-only color component, respectively, each of which values is normalized respective to luminance. An image memory supplies the display processor of a first stream of luminance-only data and a second stream of chrominance-only data. The chrominance-only data are pointer information applied as read addresses to the first and second map memories. The luminance-only data may be linearly coded luminance-only color components, per se, or may be pointer information applied as read addresses to a third map memory in which values of a luminance-only color component are stored to read out linearly coded luminance-only color component. The first and second chrominance-only components read out of the first and second map memories have their normalization respective to luminance removed, by multiplying each of them by linearly-coded luminance-only component of appropriate spatial bandwidth. First and second color-difference-signal color components in non-normalized terms are derived from the products of these multiplication processes. These two primary color components in non-normalized terms and the luminance-only color component (all linearly coded) are then linearly combined in appropriate combinations to obtain red, green and blue drive signals without gamma correction. The multiplications and linear combining processes are preferably carried out after conversion of the digital primary color components to analog form, in order to avoid multiplication in the digital regime. Alternatively, multiplication can be carried out using multiplying digital-to-analog converters.

DETAILED DESCRIPTION

Figure 1:
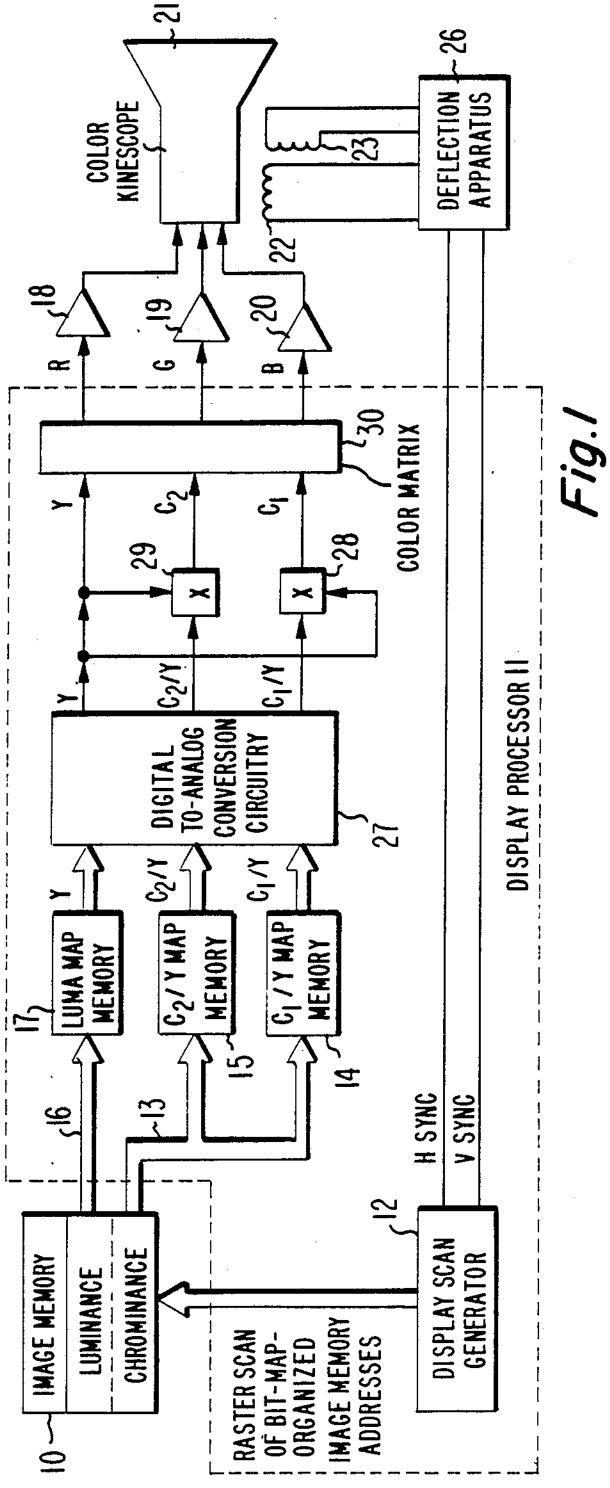
FIG. 1 is a block schematic diagram of a computer display system including a display processor embodying the invention.

A digital image memory 10 is shown in FIG. 1. Image memory 10 may, for example, include a portion of a dual-ported video random-access memory (VRAM) used as the computer main memory of a small computer with graphics capability. The VRAM, which is a dynamic memory, is written via a random-access read/-write port (not shown) using apparatus known as a drawing processor (not shown). The drawing processor also controls access to the random-access input/output port by a general-purpose processor (not shown). In addition to its random-access input/output port, the VRAM is provided with a serial output port. This serial output port is at the end of a shift register. The successive stages of the shift register can be side-loaded with a line of video data in a time as short as that required for accessing the VRAM through its random-access input-/output port. The shift register when loaded can be operated at a shift rate that is high enough to supply video data from the serial output port at a much faster rate than it can be supplied through the random-access input/output port. In some VRAM designs the shift register is replaced by a small auxiliary memory sequentially addressed during reading by output from a counter, which counter counts at the faster rate.

Image memory 10, when a portion of a VRAM used as computer main memory is included therein, also includes buffering circuitry (not specifically shown) after the VRAM serial output port for converting VRAM read-out to input signals for a display processor 11 of a type embodying the invention. This buffering circuitry generates from the VRAM serial read-out a first stream of data descriptive of the raster scanning of luminance samples in the image to be displayed, which first stream of data is supplied to display processor 11 via a bus 16. This buffering circuitry also generates from the VRAM serial read-out a second stream of data descriptive of the raster scanning of chrominance samples in the image to be displayed, which second stream of data is supplied to display processor 11 via a bus 13. The luminance and chrominance samples may respectively describe picture elements of the same size and corresponding locations in the display, which will be assumed to be the case in describing the FIG. 1 computer display system. (The first and second streams of data are then readily recognized as the equivalent of a stream of pixel codes, having luminance and chrominance subcode portions.) Alternatively, as will be considered later on in connection with the FIG. 3 computer display system, the chrominance samples may describe picture elements of greater size than the luminance samples do. In such case, the raster scanning of the chrominance samples will have fewer scan lines per image field than the raster scanning of the luminance samples, and fewer samples per scan line. The raster scanning of the chrominance samples may then be compressed in time to allow their being read-out from the VRAM and serial output port on a scan-line-by-scan-line time-division-multiplex basis with luminance samples. Buffering circuitry suitable for use with VRAM to form image memory 10 is described in detail by D. L. Sprague, N. J. Fedele and L. D. Ryan in their concurrently filed U.S. patent application Ser. No. 918,275, filed Oct. 14, 1986, and entitled "IMAGE STORAGE USING SEPARATELY SCANNED LUMINANCE AND CHROMINANCE VARIABLES" and assigned to RCA Corporation.

In the FIG. 1 computer display system, the first stream of data descriptive of the raster scanning of luminance is applied via bus 16 to the address input of a luminance map memory 17 located in display processor 11. Data in the first stream are used as pointers to luminance values stored in map memory 17 and need not themselves describe actual luminance values. The second stream of data descriptive of the raster scanning of chrominance is applied via bus 13 to the address inputs of a first chrominance map memory 14 and a second chrominance map memory 15, both located in display processor 11. Data in this second stream are used as pointers to pairs of chrominance values stored in map memories 14 and 15, and these data need not themselves describe pairs of actual chrominance values. The pointers may be arbitrarily assigned numbers or may be numbers assigned in accordance with statistical considerations concerning image content, for example.

A chrominance map memory stores color-difference signals as opposed to a color map memory, which stores color signals, if one is precise in his use of terms. However, color-difference signals have both positive and negative values, and it is generally more efficient to store values in all positive numbers in a digital memory. A color-difference signal normalized respective to luminance and then added to unity has values equal to the values of a color signal normalized to unity. In practice, then, chrominance map memories 14 and 15 may in fact comprise respective color map memories plus suitable offsetting circuits. The invention is easier to understand conceptually if map memories 14 and 15 are considered to be chrominance or "chroma" map memories storing color-difference signals normalized respective to luminance, and map memories 14 and 15 will be described in this light in the remainder of this specification. In construing the claims, however, one should take into account the equivalence described in this paragraph.

Display processor 11 responds (as will be described in greater detail further on) to the pixel codes supplied to it from image memory 10 to supply red (R), green (G) and blue (B) drive signals to video amplifiers 18, 19 and 20, respectively. It is desirable that the signals supplied to multipliers 28 and 29, and the signals linearly combined in color matrixing circuitry 30, have unity gamma—i.e., that the amplitudes of these signals be linearly related to the intensity of light levels that they are supposed to represent. Video amplifiers 18, 19 and 20 are preferably linear-transconductance type, delivering to color kinescope 21 as cathode currents linear responses to their R, G, B inputs. This makes light output from color kinescope 21 linearly related to the R, G, B inputs. Where color kinescope 21 is supplied grid or cathode voltage drive, rather than cathode current drive, compensating distortion for the non-linearity of the color kinescope guns must be provided, if light is to be linearly related to the R, G, B signals supplied from color matrix 30. This compensating distortion, a form of gamma correction, is done on the R, G and B drive signals, after color matrixing circuitry 30. These ways of driving the color kinescope 21 avoid the introduction of the color errors found in prior-art video display processors.

Color kinescope 21 is provided with horizontal-deflection and vertical-deflection coils 22, 23 to which deflection drive signals are supplied by a deflection apparatus 26. Deflection apparatus 26 receives horizontal-synchronization (H SYNC) and vertical-synchronization (V SYNC) signals from display scan generator 12 in display processor 11. This causes raster-scanning of the kinescope display screen in synchronism with raster-scanning of the bit-map-organized storage locations in image memory 10.

Consider more particularly how display processor 11 converts the pixel codes read from image memory 10 to the pixel elements presented on the kinescope 21 display screen. The first chrominance memory 14 stores values of a first chrominance-only color component, $C_1/Y$, where $C_1$ is a first color-difference signal. The second chrominance map memory 15 stores values of a second chrominance-only color component, $C_2/Y$, where $C_2$ is a second color-difference signal. Each pixel code read from image memory 10 causes map memories 14, 15 and 17 to respond with a set of Y, $C_1/Y$ and $C_2/Y$ values in sample-data digital format, which are converted to segments of continuous analog signals by digital-to-analog conversion circuitry 27.

Figure 2:
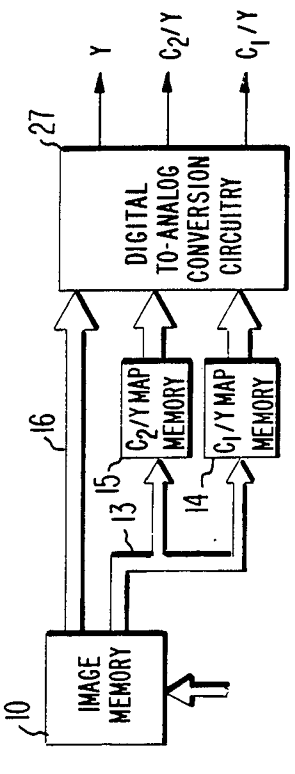
FIG. 2 is a block schematic diagram of a modification that may be made to the FIG. 1 display processor in another embodiment of the invention.

The chrominance-only color component $C_1/Y$ and $C_2/Y$ analog signals have their normalization respective to luminance removed by multiplication with Y analog signal in analog multipliers 28 and 29 respectively. The resulting analog $C_1$ and $C_2$ color-difference-signals and the analog Y luminance signal are supplied to color matrix circuitry 30 for conversion to the R, G, B drive signals supplied to video amplifiers 18, 19 and 20. (Where the luminance signal, Y, is linearly coded in image memory 10, display processor 11 can be modified such that luminance map memory 17 is dispensed with and bus 13 connects directly to the digital-to-analog conversion circuitry 27, as shown in FIG. 2.)

Consider the color matrixing circuitry 30 more particularly for a better understanding of the invention. Presume the first and second chrominance-only signals $C_1/Y$ and $C_2/Y$ are I/Y and Q/Y, for example. In the NTSC color television standard used in broadcast television, at lower spatial frequencies in the display, the primary color components Y, I and Q are defined as follows.

$$Y=0.299R+0.587G+0.114B$$

$$I=0.596R+0.274G-0.322B$$

$$Q=0.211R-0.522G+0.311B$$

I and Q sometimes have negative values, as so defined, since R and G and B may each range from zero to unity. Display processors embodying the invention preferably operate with non-gamma-corrected signals, where gamma is unity-valued. Rather than using the higher valued gamma of broadcast television as described previously, special arrangements for color kinescope drive are favored. Display intensity is then linearly related to Y amplitude, so the normalization of chromaticity with respect to luminance introduces no deviation from the constant-luminance principle.

Normalization with respect to Y preferably precedes conversion to an all positive number system so that round-off errors in the normalized chrominance-only signals do not shift their zeros to introduce an error into reference white. Normalization with respect to Y preferably uses quantization levels in Y that are available from luminance map memory 17, to avoid introducing additional quantization error into color saturation. The equations describing normalization of I and Q respective to Y are as follows.

$$I/Y=(0.596R+0.274G-0.322B)/(0.299R+0.587G+0.114B)$$

$$Q/Y=(0.211R-0.522G+0.311B)/(0.299R+0.587G+0.114B)$$

Where Y is zero valued, both I and Q are zero valued. One can consider I/Y and Q/Y each in the limit as R and G and B approach zero, then, to define the divide-by-zero values of these terms. The steps to best utilize the dynamic range of chrominance map memory 14 will be first considered; then the steps to best utilize the dynamic range of chrominance map memory 15 will be considered.

The most negative value of I/Y, $-2.82$, occurs when $R=0$, $G=0$, $B\neq0$; its most positive value, $+1.99$, occurs when R≠0, G=0, B=0. That is, I/Y has a range of 4.82. Assuming chrominance map memory 14 is to store 8-bit numbers, it is desirable to rescale to (255/256)·(I/Y)/4.82=I/4.84Y and to add an offset of 0.582 (in suitable binary fraction form) so the stored values are all positive.

The most negative value of Q/Y, −0.89, occurs when R=0, G≠0, B=0; its most positive value, 2.73, occurs when R=0, G=0, B≠0. That is, Q/Y has a range of 3.62. Assuming chrominance map memory 15 is to store 8-bit numbers, it is desirable to rescale to (255/256) (Q/Y)/3.62=Q/3.63Y and to add an offset of 0.245 (in suitable binary fraction form) so the stored values are all positive.

Adding offset values to the chrominance values in chrominance map memories 14 and 15 so the contents are always positive-valued makes them in fact store color values normalized to luminance, rather than color difference values normalized to luminance. The digital-to-analog conversion circuitry 27 is more simply operated where all digital input values are positive-valued, so it is preferable to retain the offset in these digital input values. The subtraction of the offset values is preferably done in the analog regime as a final step in the digital-to-analog conversion processes in circuitry 27, so the multipliers 28 and 29 receive color difference signals as multiplicand signals. This procedure requires that multipliers 28 and 29 be two-quadrant multipliers, but there are a number of practical advantages. One is that analog Y signal gain with regard to Y supplied to color matrix circuitry 30 can be controlled independently of analog Y signal gain with regard to Y furnished as multipler signal to multipliers 28 and 29. This affords independent brightness and color saturation controls.

Figure 3:
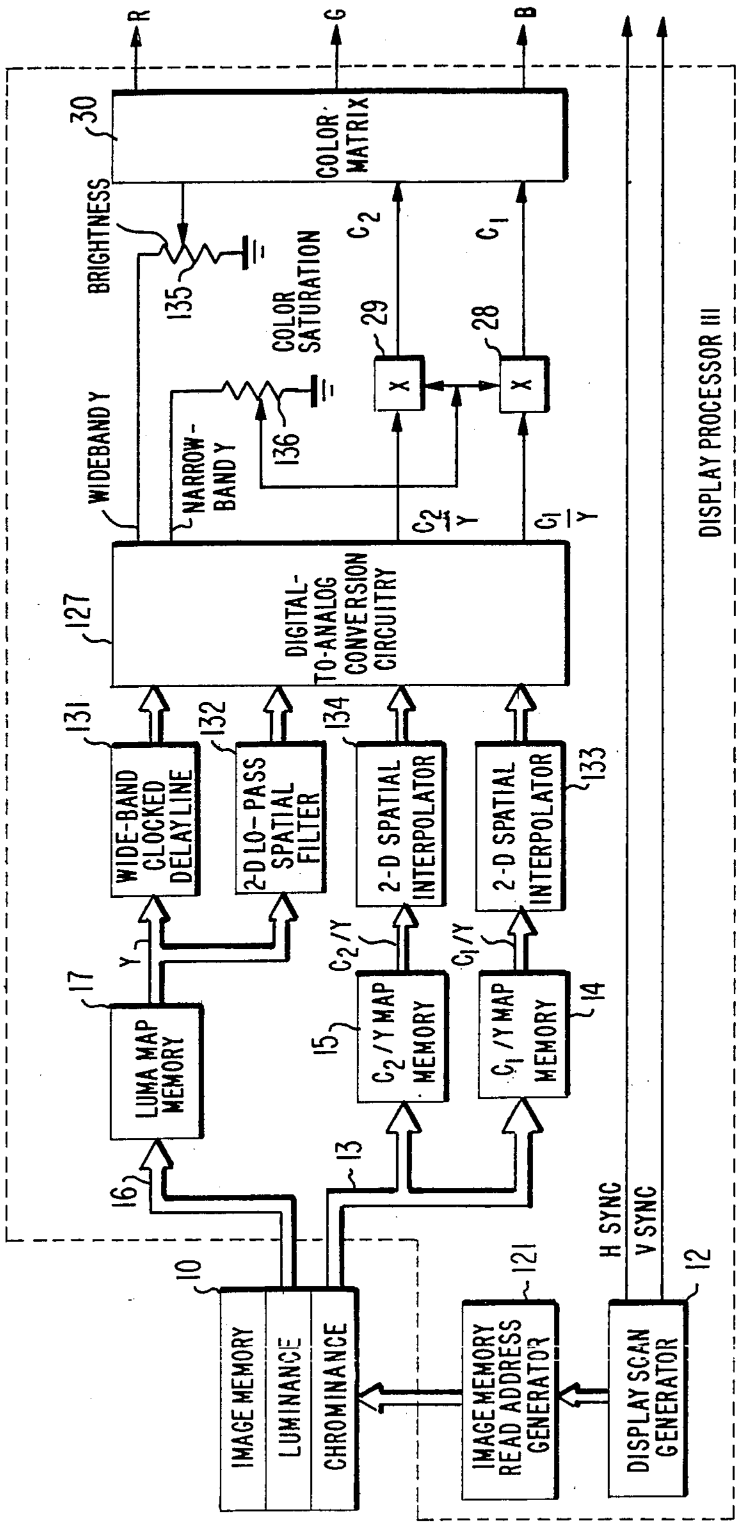
FIG. 3 is a block diagram of another display processor embodying the invention.

In the case where $C_1$/Y and $C_2$/Y spatial bandwidths are more restricted than Y spatial bandwidth, as will be treated further on in connection with the FIG. 3 display processor, the application of color-difference signals as multiplicands to multipliers 28 and 29 avoids the generation of Y-related partial product terms in their output signals arising from the Y signal multiplying the offset terms. Such Y-related partial products undesirably complicate color matrixing to obtain red, green and blue color drive signals.

Consider now how the red, green and blue color drive signals R, G and B are developed in color matrixing circuitry 30, supposing multipliers 28 and 29 receive $C_1$/Y and $C_2$/Y without offsets as their multiplicand signals. At lower spatial frequencies R is defined as follows, solving for R in the equations defining Y, I and Q.

$$R=Y+0.956I+0.623Q$$

This equation is rewritten in terms of three input signals to color matrixing circuitry 30, Y, (I/4.84) and (Q/3.63) as follows.

$$R=Y+4.62\,[(I/4.84)]+2.26\,[(Q/3.63)]$$

At lower spatial frequencies G is defined as follows, solving for G in the equations defining Y, I and Q.

$$G=Y-0.272I-0.648Q$$

This equation is rewritten in terms of the three input signals to color matrixing circuitry 30 as follows.

$$G=Y-1.316\,[(I/4.84)]-2.35\,[(Q/3.63)]$$

At lower spatial frequencies B is defined as follows, solving for B in the equations defining Y, I and Q.

$$B=Y-1.105I+1.705Q$$

This equation is rewritten in terms of the three input signals to color matrixing circuitry 30 as follows.

$$B=Y-5.35\,[(I/4.84)]+6.19[(Q/3.63)]$$

The circuitry 30 to implement the three linear combining processes to get linear R, G and B color drive signals is straightforward design to one skilled in the art and provided with the three equations defining circuitry 30 output signals in terms of its three input signals.

The fact that Y in the luminance map memory 17 output is constrained to be somewhat less than unity (e.g. 255/256 for eight-bit output) to most efficiently utilize digital dynamic range, is of little consequence. Y appears as a factor in all three inputs to color matrixing circuitry 30, so its scaling does not affect the color matrixing equations other than reducing circuitry 30 transfer gains slightly.

If the red, green and blue phosphors in the screen of color kinescope 21 have the colorimetric values of NTSC phosphors, the colorimetry described above will be correct. Generally, modern red, green and blue phosphors differ from the NTSC standard. Minor color errors may be tolerated or the basic colorimetric equations may be corrected to suit the phosphors. (If the removal of I and Q normalization and color matrixing are carried out in the digital regime before digital-to-analog conversion, rather than being carried out in the analog regime after digital-to-analog conversion as shown in FIG. 1, adjustments may be made of numerical coefficients in the matrix equations to simplify the digital multiplication steps in the digital color matrixing circuitry, as well.)

Map memories 14, 15 and 17 may be read-only memories (ROMs) or programmable read-only memories (PROMs). In practice it is often most advantageous that map memories 14, 15 and 17 be random-access memories, the contents of which are rewritten by down-loading from a computer main memory which contains image memory 10. J. V. Sherrill and D. L. Sprague in their concurrently filed, U.S. patent application Ser. No. 918,552, filed Oct. 14, 1986 and entitled "DISPLAY PROCESSOR UPDATING ITS COLOR MAP MEMORIES FROM THE SERIAL OUTPUT PORT OF A DUAL-PORTED IMAGE MEMORY" and assigned to RCA Corporation describe such rewriting of random-access map memories by down-loading at the pixel scan rate from the serial output port of a dual-ported VRAM used as computer main memory. This permits substantial portions of map memories like 14, 15 and 17 to be re-written in the line retrace intervals of the display, which customarily are about one-fifth as long as the line trace intervals.

Consider the usefulness of including a luminance map memory 17 in display processor 11 as shown in FIG. 1, rather than omitting it as shown in FIG. 2. If one wishes the percentage of quantization error in luminance to be constant over its dynamic range, rather than there being a higher percentage of quantization error in low-level luminance than in high-level luminance, it is desirable to linearly code the logarithm of luminance rather than luminance itself. So, especially where the number of bits used to code luminance is restricted, there is less apparent error in luminance if one linearly codes a logarithm of Y rather than Y. If this is done, the luminance map memory 17 provides the antilogarithm table to recover linearly coded Y.

Luminance map memory 17 may be used in a variety of other schemes for removing Y amplitude compression, as well. It is noted that the human eye is not a perfect logarithmic light detector. A true logarithmic coding of Y has been found by some prior-art workers to exaggerate too much the quantizing noise in image highlights. See, for example, W. F. Schreiber's article "Image Processing for Quality Improvement" on pages 1640–1651 of *PROCEEDINGS OF THE IEEE,* Vol. 66, No. 12, December 1978, especially section V, subsection C.

In any case, the spacing between successive read addresses of luminance map memory 17 can be made to describe perceptually equal variations in luminance. Combining such a luminance map memory 17 with chrominance map memories 14 and 15, successive read addresses of which describe perceptually equal variations in chrominance, one can more efficiently code color space.

The number of just noticeable differences (JNDs) in chromaticity has been estimated as being seventeen thousand, of which only about four thousand have been estimated as being reproducible with commercially available color kinescopes. (For a more complete understanding of JNDs of chromaticity see pages 60–61 of PRINCIPLES OF COLOR TELEVISION by the Hazeltine Laboratories Staff, John Wiley & Sons, N.Y.). Fortunately these chromaticity values include those of interest in reproducing natural scenes or in producing artistic effects. Normalization of chrominance information relative to luminance can reduce to twelve the number of bits required to code chrominance without perceptible error, then, if appropriate chrominance map entries are made. MacAdam's book indicates that information concerning optimal choices of color map entries for spacing chromaticity values uniformly is available from work done by members of the Optical Society of America. Where chrominance map memories are never to be updated, the maximum number of read addresses required for them to reproduce all differentiable colors is thus established to be about $2^{12}$.

In chapter eight of his book, MacAdam indicates that the "uniform" chromaticity diagram, where perceptually equal color differences are represented by equal distances between points that represent equally luminous colors, has been sought for unsuccessfully for fifty years; and much of the accumulated evidence indicates that the goal is unattainable. This commentary has great significance with regard to digitally coded chrominance signals. Such signals are sampled-data signals in color space; and one wishes to locate those sampled-data in color space at points separated by perceptually equal color differences, to allow the minimum number of sampled data to describe all perceptible variations in chrominance. If the points separated by perceptually equal color differences are not uniformly separated in some two-dimensional projection of equally luminous colors in linear color space, there is no linear coding of chrominance signals that will code all perceptible variations in chrominance signals with maximum efficiency. Linear coding of chrominance signals will invariably require more than twelve bits to code all perceptible chrominance variations that are estimated to be reproducible in a color kinescope display.

Chrominance mapping can implement non-linear coding of chrominance signals, thus avoiding having to have a "uniform" chromaticity diagram in order to efficiently code all perceptible chrominance variations that are reproducible by a display apparatus or to efficiently code chrominance variations with resolution of a few JNDs. The read addresses of the chrominance map memory can be made to correspond to points in color space that have equal luminosity and are separated by perceptually equal color differences, and the chrominance values associated with each point so assigned a read address can be entered as data into their respective chrominance map memories. Even where, in order to reduce the number of read addresses for the chrominance map memories, only selected regions of the chromaticity diagram are mapped, this procedure of efficiently sampling the chromaticity diagram can be used to advantage in deciding how to apportion chromaticity values into bins each of which is associated with a respective read address.

Note that the use of a luminance map 17 is facilitated by the fact that color saturation is normalized respective to the luminance signal in the values of $C_1/Y$ and $C_2/Y$ stored in color map memories 14 and 15. This obviates the complex luminance/chrominance tracking problems otherwise associated with non-linear coding of the luminance-only color component. These problems are so severe that they have impeded the use of non-linear luminance coding when displays are to be in full color. A related problem where the color map addresses have to correspond to respective luminance map addresses, which problem introduces itself when the color map memories store color values that are not normalized with respect to luminance-only color component, is also avoided.

When the logarithm of Y is linearly coded, it may be practical to arrange for the chrominance map memories to store values of the logarithms of $(C_1+O_1)/Y$ and $(C_2+O_2)/Y$, $O_1$ and $O_2$ being offset values included to facilitate logarithmic processing. This facilitates the multiplications of $(C_1O_1)/Y$ and $(C_2+O_2)/Y$ by Y being done in the logarithmic regime, using adders. Then log $[(C_1+O_1)/Y)]$ and log $[(C_2+O_2)/Y)]$ as well as log Y are subjected to a logarithm-to-antilogarithm transform before color matrixing. This is done during digital-to-analog conversion or is done using look-up read-only memory before digital-to-analog conversion. Such read-only memory may be provided by time-division-multiplexing the luminance map memory to take the antilogarithms of log $[(C_1+O_1)/Y]$ and of log $(C_2+O_2)/Y)$ as well as of log Y; or, alternatively, separate read-only memories may be used. The $O_1Y$ and $O_2Y$ terms in the products of multiplication are removed by destructive linear combination with scaled Y in the arithmetic regime; this is done before color matrixing circuitry 30.

In other embodiments of the invention, the memory interface circuitry preceding display processor 11 may be made considerably more sophisticated than that shown in FIG. 1. The interface circuitry may include a data rate converter between image memory 10 and display processor 11. This data rate converter can be used to withdraw luminance and chrominance information from image memory 10 on a time-interleaved basis, rather than in parallel. Image memory 10 then can use separate bit-map organizations for storing luminance and chrominance information. This data rate converter may provide for selecting among different data rate conversions. The interface may then be one that allows a variety of different-length pixel codes to be accommodated, converting them to suitable form for application as read addresses to map memories 14, 15 and 17.

FIG. 3 shows a display processor 111 that exemplifies modifications of the display processor 11 to accommodate image memory 10 using separate bit-map organizations for chrominance that are more sparsely sampled in each of two orthogonal spatial dimensions than the separate bit-map organization for luminance. The fact that acuity in chrominance is inferior to acuity in luminance within the human visual systems is taken into account to reduce the amount of storage required for chrominance in image memory 10.

An image memory read address generator 121 is used in conjunction with display scan generator 12. During successive display line trace intervals image memory read address generator 121 raster scans the bit-map organization portions of image memory 10 storing luminance map memory 17 read addresses, responsive to which luminance map memory 17 generates samples at full spatial sampling density descriptive of the luminance component of the display. This raster scanning of the Y bit map is in real time, but is advanced a number of lines respective to the display scan timing to compensate for a wide-band clocked delay line 131 between luminance map memory 17 and digital-to-analog conversion circuitry 127. Wide-band clocked delay line 131 introduces delay into the wide-band Y signal to compensate for delay introduced by a two-dimensional low-pass filter 132 into a narrowband Y signal response it supplies as multiplier signal to multipliers 28 and 29.

Image memory address generator 121 raster scans, on a time-division-multiplex basis, the bit-map-organization portions of image memory 10 storing read addresses for chrominance map memories 14 and 15. This raster scanning is done during the display line retrace intervals on a compressed-time basis. Responsive to these raster scans, chrominance map memories 14 and 15 supply time-compressed chrominance data to two-dimensional spatial interpolators 133 and 134 respectively. Each of the interpolators includes at least two lines of storage for chrominance samples. This storage is most easily provided for by using small random-access memories with counter-supplied addressing, and with suitable input and output multiplexing to generate the bed of chrominances sample needed for the weighting and summing procedures of two-dimensional spatial interpolation. Interpolation of signals with unity gamma is desirable in order to avoid color errors. These random-access memories are written and read so as to provide the rate buffering required to place two-dimensionally interpolated chrominance samples in proper temporal alignment with the luminance samples at the output of the two-dimensional low-pass spatial filter 132. Interpolators 133 and 134 supply two-dimensionally spatially interpolated $C_1/Y$ and $C_2/Y$ data streams, respectively, at pixel scan rate to digital-to-analog conversion circuitry 127 for conversion to analog $C_1/Y$ and $C_2/Y$ multiplicand signals for the multipliers 28 and 29.

These $C_1/Y$ and $C_2/Y$ multiplicand signals have a restricted spatial bandwidth compared to the wide-band luminance (or Y) signal. The restricted spatial bandwidth arises because $C_1/Y$ and $C_2/Y$ are sampled at less than the Nyquist limit associated with the rate of read address application to the chrominance map memories 14 and 15, in order to avoid the introduction of aliasing terms when one encodes images as the read addresses for map memories 14, 15 and 17. In the encoding procedure for chrominance, the $C_1$, $C_2$ and Y signals used for calculating the quotients $C_1/Y$ and $C_2/Y$ are made to have spatial bandwidths that do not exceed that Nyquist limit, when aliasing is to be minimized. Also the spatial bandwidth of the quotients $C_1/Y$ and $C_2/Y$ are restricted through two-dimensional low-pass spatial filtering, so they are sampled below the Nyquist limit at the rate of read address application to chrominance map memories 14 and 15. The last step in the encoding procedure for chrominance is the conversion of the $C_1/Y$ and $C_2/Y$ quotients to read addresses, which step preferably should be the one in which the rounding off of $C_1/Y$ and $C_2/Y$ amplitudes is determined.

To avoid the generation of aliasing terms in the process of de-normalizing $C_1/Y$ and $C_2/Y$ to generate $C_1$ and $C_2$ in display processor 111, the Y multiplier signal supplied to multipliers 28 and 29 is restricted to a spatial bandwidth commensurate with that of $C_1/Y$ and $C_2/Y$. Restricting Y spatial bandwidth in two dimensions is most simply accomplished in the digital sampled-data regime, using the two-dimensional low-pass spatial filter 132 following luminance map memory 17. The response of filter 132 is converted to analog signal form by digital-to-analog circuitry 127 to be used as multiplier signal by multipliers 28 and 29.

The two-dimensional low-pass spatial filter 132 is a transversal filter. It includes a number of one-line-duration delays in its construction, assuming two-dimensional filtering is done on a separable basis, spatially filtering separately in the directions of line scan and line advance. These delays can be provided by small random-access memories addressed by counters counting at the pixel scan rate. One skilled in the art of digital filter design will understand that these same delay elements can be used for dual purpose as the basis for the wide-band delay circuit 131, as well as generating properly delayed samples for being weighted and summed in low-pass spatial filter 132.

In FIG. 3 the wideband Y signal from digital-to-analog conversion circuitry 127 is shown as being applied to color matrixing circuitry 30 through an adjustable gain control 135, which serves as a BRIGHTNESS control. The narrowband Y signal from digital-to-analog conversion 127 is shown as being applied as the multiplier signal to multipliers 28 and 29 through an adjustable gain control 136, which serves as a COLOR SATURATION control.

Where high resolution graphics are not required, the FIG. 3 display processor 111 provides substantial economy in chrominance information requirements. Subsampling of image space 4:1 in the directions of line scanning and line advance allows a 16:1 reduction in the chrominance information used in the display.

Display processors which allow the features of display processors like 11 and 111 to be selectively employed may be constructed in accordance with the invention. Time-division-operation of the two types of display processor to create a montage image for display may also be constructed in accordance with the invention.

Consider now the nature of the pixel codes used with display processors embodying the invention. The way the broadcast color television art has analyzed each color pixel is as the linear combination of a luminance color component of given amplitude and two chrominance-only color components of given amplitudes. The amplitude of the luminance signal, Y, describing the luminance component of color, represents the luminosity of the pixel. In the absence of color difference signals of non-zero value, Y can be identified with gray scale. Neither of the color-difference signals correspond with any actual color, but together their amplitudes describe the differences of any actual color from the luminance-only color component. In much of the prior art the amplitudes of the signals respectively describing these primary color components have been linearly coded. The number of bits in the range of linearly coded color signals cannot differ much from the number of bits in the linearly coded luminance signal Y or there will be quantization errors in the color matrixing of the signals during respective components of color which undesirably give rise to visible contouring in the display.

Contouring of a type sometimes called "color posterization" and sometimes called "color puddling" is the replacement of a gradual change in chromaticity with an abrupt change in color or with a series of abrupt changes in color. Contouring due to linearly coded color-difference signals $C_1$ and $C_2$ having too few bits compared to linearly coded luminance signal Y can be analyzed as comprising two components, it is here pointed out. There is a type of contouring with regard to hue change, which the human observer with normal color vision is quite sensitive to. There is also a type of contouring with regard to change in color saturation, which the human observer with normal color vision is relatively insensitive to. (Contouring in luminance can be a problem as well if the number of quantization levels in luminance is too small or the quantization levels are poorly spaced.)

Chrominance mapping helps to overcome many of the contouring problems associated with color information being expressed in fewer bits. The chrominance map memories need not map all regions of color space, but only those regions involved in the current display. Neighboring pixels in most display fields have a considerable degree of correlation in their chrominance values. These facts allow compromises to be made with regard to the amount of color space to be mapped and the degree of color resolution it is to be mapped with, so one can decide upon using a number of color map addresses substantially fewer than $2^{12}$. Typically, there are about $2^6$ to $2^8$ chrominance pixels across the display in the direction of display line scan. If the map memories containing chrominance information can be rewritten in one or two line retrace intervals, then, only six-bit to eight-bit read addressing is required of them, even if the chrominance pixels are not correlated. The rewriting of the chrominance map memories 14 and 15 can be done in a shorter time when there are only two of them, which is a practical advantage over the Dalke and Buchanan scheme of color mapping.

Chrominance mapping with $C_1$ and $C_2$ values being normalized respective to Y strongly tends to make chrominance values more correlated. This substantially reduces the number of values likely to be needed in the chrominance map memories, and consequently reduces the number of chrominance map addresses required. This makes it more likely that map memories containing chrominance information can be rewritten in a shorter time, facilitating statistical coding procedures.

To elaborate, most of the light in most images is illumination reflected from surfaces, rather than direct illumination from a light-producing source. Each of these surfaces usually is lit with a light of reasonably constant chromaticity over that surface. Consequently, relative color saturation and hue are likely to be substantially constant across portions of the surface which would be considered to be the same color by one viewing them in reference white illumination. Most color variations in those portions of the surface are likely to be due to luminance variations. Color variation solely due to luminance variation is accommodated in the invention by the multiplications by luminance signal Y that are used to remove normalization from the two chrominance-only signals, $C_1/Y$ and $C_2/Y$, to recover the two color-difference signals, $C_1$ and $C_2$.

The wide variety of products of these multiplications are more economically expressed in terms of the luminance-signal multiplier and the two color-difference-signal multiplicands. E.g., $2^m$ possible luminance-signal values and $2^n$ possible combinations of the values of the two color-difference signals provide for describing $2^{(m+n)}$ colors, with chrominance map memories 14 and 15 only having to provide $2^n$ combinations of read-out values. The chrominance map memories do not have to supply $2^{(m+n)}$ combinations of read-out values as would be the case with chrominance map memories that stored values of color-difference signals which were not normalized respective to the luminance-signal. This has the advantage that a far larger number of different colors can be described for a given chrominance map memory size.

The contouring associated with poor luminance/-chrominance tracking does not arise in display processors embodying the invention because the multiplications used to remove normalization from $C_1/Y$ and $C_2/Y$ guarantee that such tracking must exist between Y and both $C_1$ and $C_2$. Contouring in hue and contouring in color saturation as caused by poor luminance/-chrominance tracking are absent as long as the results of the multiplications used to remove normalization from $C/Y$ and $C_2/Y$ are not truncated or rounded off in some way. Truncation and round-off problems do not occur when the multiplications are done in the analog regime as shown in FIG. 1 display processor 11, supposing analog-to-digital conversion does not introduce such problems.

Any contouring in color saturation that remains in displays created using display processors that embody the invention primarily arises from quantization error with regard to relative color saturation. This arises because the values of too few colors of the same or similar hue, but differing color saturation, are stored in chrominance map memories 14 and 15. Any contouring in hue that remains in displays created using display processors that embody the invention arises primarily from quantization error with regard to hue. This arises because the values of too few colors of the same or similar color saturation, but differing hue, are stored in chrominance map memories 14 and 15. The number of these closely grouped color values that must be stored in chrominance maps 14 and 15 to avoid contouring in relative color saturation or in hue is usually reduced, of course, by the normalization respective to luminance.

Where there is a tendency toward contouring in colors of similar chromaticity, the chrominance map memories 14 and 15 must store many of these similar chromaticity values to support a display line. This means that the $C_1$ and $C_2$ values stored in chrominance map memories 14 and 15 should have a sufficient number of bit places (e.g. seven or eight) to resolve these small differences in chromaticity. However, if a subtle chromaticity variation requires sixteen, for example, of these closely grouped chrominance-only differences, this only entails sixteen read addresses for chrominance maps 14 and 15. These sixteen read addresses can be specified in a set of read addresses with substantially fewer bits than the combined number of bits in $C_1$ and $C_2$. The image memory 10 does not have to supply the combined number of bits (e.g., sixteen) required to describe two color-difference signals accurately in linear coding.

The address codes for color map memories 14 and 15 can be entirely arbitrary as to the hue and relative color saturation they specify. Using arbitrary address codes facilitates using fewer pixel codes for coding pixels which are in groups of closely related chromaticity values. When chrominance map memories 14 and 15 can be re-written at a high rate during the line retrace interval by down-loading from the serial port of a dual-ported VRAM (also containing image memory 10) groups of similar chromaticities appropriate to a particular display line can usually be loaded in the preceding line retrace interval or two. Chrominance map memories 14 and 15, then, readily provide adaptive chrominance decoding that is adjusted to suit the image being displayed. There can be fewer bits in the addresses to chrominance map memories 14 and 15 accessing fewer values of chromaticity, but those values of chromaticity will be those which are appropriate to the line being displayed. Since, except for the case where a long surface edge falls along the scan line direction in the display, there is usually appreciable correlation between the chromaticity of pixels in adjacent scan lines of a non-interlaced display (or scan lines separated by an intervening scan line of a interlaced display) it is unlikely the chrominance map memories 14 and 15 will have to be completely re-written from one scan line to the next. Since there is normalization of $C_1$ and $C_2$ respective to Y, the number of chrominance map entries that needs to be rewritten from one scan line to the next is even more likely to be small.

Using arbitrary address codes for chrominance map memories 14 and 15 strongly tends to shorten the bit-length of read address codes in an image-adaptive chrominance map memory address coding scheme. This is because the selections of chrominance values in the chrominance maps are independent of read address values, and accordingly the whole gamut of chrominance values does not have to be conformally mapped by the read addresses. Only the sets of chrominance-only values for different pixels appearing in the portion of the image that will be displayed the color map memories 14 and 15 need be stored in color map memories 14 and 15. The number of read addresses need not be larger than the number of those sets of chrominance values. Chrominance mapping used together with adaptive pixel coding is an important procedure in applying statistical techniques to compress digital descriptions of pixel chromaticity when there is redundancy in pixel chromaticity in a display image.

When image-adaptive chrominance map memory address coding schemes are not employed, certain fixed schemes of address coding that are regular in nature, rather than arbitrary in nature, may be desirable. Some of them allow interpolation to be used to reduce the size of the chrominance map memories 14 and 15.

Rather than one using arbitrary address codes for chrominance map memories, for example, one may arrange to use address codes for the chrominance map memories 14 and 15 which allocate $C_1/Y$ information to certain bit places and allocate $C_2/Y$ information to certain other bit places. If human vision is more sensitive to variation in one of these forms of information, it may be allocated a bit or two more than the other in the chrominance map addresses.

One may also arrange to use addresses which allocate hue information to certain bit places and allocate relative color saturation information to certain other bit places, as Dalke and Buchanan describe. This may be done to implement more user-friendly color programming in the computer system. The number of bit places allocated to hue may be larger than the number of bit places allocated to relative color saturation, taking into account that human observers with normal color vision tend to be more sensitive to contouring in hue than in relative color saturation.

One can reduce the size of the chrominance map memories 14 and 15 by interpolation if the read addresses conformally map the chromaticity plane. Such conformal mapping obtains where read addresses are expressed in $C_1/Y$ and $C_2/Y$ terms, naturally. Such conformal mapping can also obtain where read addresses are expressed in terms of a radial relative color saturation component and an angular hue component in a polar-coordinate description of the chromaticity plane.

Where complete chrominance map memories describing all JNDs chromaticity are desired, the read addresses for the chrominance map memories can, as has been pointed out previously in the specification, describe chromaticity values with equal perceptual spacing among neighboring ones of them. One may arrange to use a series of consecutive read addresses to map chromaticity space in a folded line with equal perceptual distances between adjacent folds in chromaticity space. The non-linear function in color space associated with each of these folds may be described approximately on a piecewise linear basis, each piece being an equal number $K=2^k$ of chromaticity JNDs long and affording a chord approximation to a curvature in chromaticity. The number k is a positive integer. The chromaticity values of the chord intersections may be stored in chrominance map memories that subsample chromaticity values in each fold of perceived chromaticity space, to reduce the number of chromaticity map memory read addresses by the factor K. These read addresses are used as more significant bits in chrominance codes that include lesser significant bits for linearly interpolating between two successive chromaticity values K JNDs apart. There is some loss of code efficiency at the loop ends of the serpentine because linear interpolation is between two chromaticities one JND apart rather than K JNDs apart. This procedure can be used to attempt to map chromaticity space completely with twelve-bit or thirteen-bit chroma codes, while keeping chroma map memories to eight-bit read address size, for example. Optimal serpentine patterns across chromaticity space can presumably be found after diligent search. Optimization can strive for best chord approximation (that is, for least color error for given K), or for best code efficiency (that is, for least color error for given K), or for code efficiency (that is, the least number of folds in linear color space and thus the least number of loop ends), or for a good compromise between the foregoing desiderata.

Figure 4:
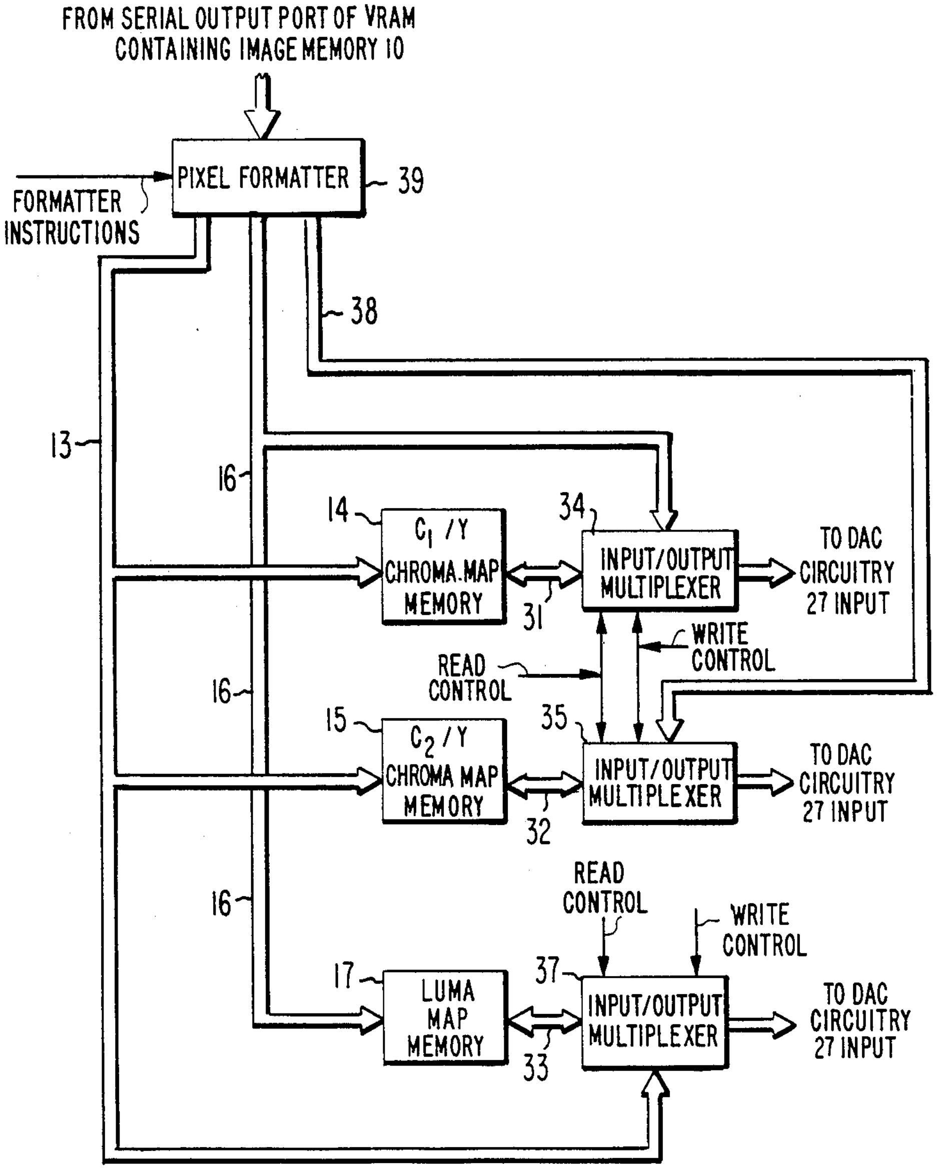
FIG. 4 is a block schematic diagram showing how the chrominance map memories and the luminance map memory of the FIG. 1 display processor may be arranged for writing and reading.

FIG. 4 is useful in explaining how the down-loading of the chrominance map memories 14, 15 and the luminance map memory 17 in the FIG. 1 drawing processor 11 may be carried out. A similar technique may be employed in the FIG. 3 drawing processor 111, but allowance must be made for allocating display line retrace intervals to two functions: namely, to the rewriting of map memory and to the furnishing of time compressed chrominance to the two-dimensional spatial interpolators 133 and 134. The reader is referred to U.S. patent application Ser. No. 918,275 concurrently filed by D. L. Sprague, N. J. Fedele, and L. D. Ryan, entitled "IMAGE STORAGE USING SEPARATELY SCANNED LUMINANCE AND CHROMINANCE VARIABLES", for details. Return consideration again to how the chrominance map memories 14 and 15 are reloaded in the FIG. 1 drawing processor 11.

During display line trace intervals, a pixel formatter 39 parses the data flow from the serial output port of the VRAM containing image memory 10 into individual pixel descriptions of adjustable length, each comprising a first portion applied to chrominance map memory addressing bus 13 and and a second portion applied to luminance map memory addressing bus 16. Map memories 14, 15 and 17 have input/output multiplexers 34, 35 and 37 respectively associated with them. During display line trace intervals input/output multiplexers receive read control signals that condition ranks of tri-state output driver circuits in the input/output multiplexers 34, 35 and 37 to supply the sensed contents of the addressed locations in map memories 14, 15 and 17 at relatively low output impedance from the input/output buses of map memories 14, 15 and 17 to respective inputs of the digital-to-analog conversion circuitry 27 (not explicitly shown in FIG. 4).

During portions of field retrace intervals, when luminance map memory 17 contents are to be updated, the input/output multiplexer 37 associated therewith receives a write control signal conditioning a rank of tri-state input driver circuits therein to apply at relatively low impedance the second portions of the pixel descriptions furnished by formatter 39 to bus 13 as write inputs to the input/output bus 33 of luminance map memory 17. The first portions of the pixel descriptions furnished by pixel formatter 39 to bus 16 are used as write addresses during the updating of luminance map memory 17 contents. If the throughput rate through pixel formatter 39 during the updating of luminance map memory 17 contents in the field retrace interval is the same as the pixel scan rate during display line trace intervals, the entire contents of luminance map memory 17 can be rewritten in a time duration that is usually somewhat shorter than that of a display line trace interval.

This is best understood considering an illustrative example in a 480-line display with 3:4 height-to-width aspect ratio and square pixels, there are 640 pixels per line trace interval. If the luminance map memory 17 has eight-bit addressing (normally more than sufficient address resolution), the $2^8=256$ storage locations can be re-written at pixel scan rate in $256/640=0.4$ line trace interval. If the luminance map memory 17 has seven-bit addressing, it can be re-written at pixel scan rate in 0.2 line trace interval. It should be noted that line retrace interval is customarily about 0.2 line trace interval.

When the contents of chrominance map memories 14 and 15 are to be updated, pixel formatter 39 is conditioned to supply individual pixel descriptions comprising a third portion applied to a bus 38, as well as the first and second portions applied respectively to buses 13 and 16. The first portions of the pixel descriptions furnished by pixel formatter 39 to bus 13 are used as write addresses during the updating of the contents of chrominance map memories 14 and 15. The input/output multiplexer 34 associated with chrominance map memory 14 receives a write control signal conditioning a rank of tri-state input drive circuits therein to apply at relatively low impedance the second portions of the pixel descriptions furnished by formatter 39 to bus 13 as write inputs to the input/output bus 31 of chrominance map memory 14. The input/output multiplexer 35 associated with chrominance map memory 15 receives a write control signal conditioning a rank of tri-state input drive circuits therein to apply at relatively low impedance the third portions of the pixel descriptions furnished by formatter 39 to bus 31 as write inputs to the input/output bus 32 of chrominance map memory 15.

The contents of chrominance map memories 14 and 15 are completely updated during field retrace intervals, or at least selected ones of the field trace intervals, just as the contents of luminance map memory 17 are. Completely updating the contents of chrominance map memories, if the throughput rate through pixel formatter 39 during updating is the same as pixel scan rate during display scan intervals, will occupy another time duration equal to that for completely updating luminance map memory 17, presuming that the number of addresses in each of chrominance map memories 14 and 15 is the same as the number of addresses in luminance map memory 17. Since this number is usually about the square root of the number of possible chrominance conditions (that is, the chrominance map addresses each have half the number of bit places as the two color-difference signals together have), there arises a need to rely on adaptive pixel coding. In this adaptive pixel coding the contents of chrominance map memories 14 and 15 are altered, when necessary, during display line retrace intervals. Since adaptive pixel coding is relied on, it is usually possible to shorten the addresses still further.

It is easy to see how few-bit addresses suffice in color map memories 14 and 15 when the display consists of text, simple graphics or combinations of text and simple graphics. Few-bit addresses suffice also for most scan lines in broadcast television quality display material. If the chrominance map memories 14 and 15 can be completely re-written (or substantially so) during display line retrace interval, the chrominance-only information can be adaptively coded with the chrominance-only coding changing from one scan line to the next. In broadcast-television-quality video signals, chrominance bandwidth is smaller than luminance bandwidth in the horizontal direction. E.g., if there is 640 pixels per line resolution in luminance, there is only 160 pixels per line resolution in chrominance. While the I and Q chrominance vectors used in broadcast television are relatively wider and narrower in spatial bandwidth, chrominance vectors with more equal spatial bandwidths may be chosen so there are perhaps only 128 chrominance pixels per line in the broadcast quality display.

At most, this requires seven-bit addressing of chrominance map memories 14 and 15 to correspond to the storage locations needed for completely specifying each pixel in the display line trace interval, presuming all these pixels to differ in chrominance value. At most this requires all $2^7$ storage locations to be rewritten between display scan lines, assuming no pixel in a scan line has the same chrominance-only values as any of the pixels in the scan line preceding it in time. Even where this seven-bit wide addressing of chrominance map memories 14 and 15 is used, the use of chrominance map memories provides a substantial saving in image memory 10 over the case where seven-bit-wide or eight-bit-wide linear codes of both color-difference signals $C_1$ and $C_2$ are used.

In most images, however, there is a high degree of correlation of chrominance-only values for pixels in the same region of the display field. The correlation of chrominance-only values in the scan line direction forces down the number of chrominace map memory locations accessed in a scan line, so fewer-bit address codes in chrominance map memories 14 and 15 are possible for selected scan lines.

The correlation of chrominance-only values in the scan line direction also reduces the likelihood of having to extensively re-write the contents of the chrominance map memories 14 and 15 from one line to the next. The correlation of chrominance-only values for pixels in successive-in-time scan lines reduces the likelihood of having to extensively re-write the contents of chrominance map memories 14 and 15. This leaves larger portions of the line retrace interval when the serial port of the VRAM is available for loading instructions of various kinds into instruction registers of the display processor 11. These instruction registers include, for example, registers for holding formatting instructions for pixel formatter 39.

Pixel formatter 39 operates using a serial-in/parallel-out register for storing up to two successive pixel descriptors, barrel shifters for justifying the boundaries between the portions of the pixel descriptors, and ranks of AND gates for selecting the bits associated with each pixel descriptor portion the pixel formatter 39 is to supply to buses 13, 16 and 38. Instruction registers are required for controlling the number of bit places the barrel shifters are to provide. Instruction registers are also required to store mask patterns supplied to the ranks of AND gates to control which bits of the justified pixel descriptors are to be supplied to buses 13, 16 and 38.

Rather than down-loading from computer main memory the write addresses for the chrominance map memories 14, 15 and the luminance map memory 17 when those map memories are being rewritten, the write addresses may be supplied by a sequential address generator in display processor 11. Doing this does not provide for changing only selected locations in map memories 14, 15 and 17. So, a schedule must be specified for re-writing the entire contents of each of the map memories 14, 15 and 17.

Display processors can be constructed which operate in accordance with the multiplicative/additive system of describing color, but which use more than two chrominance map memories. Such a display processor using (R-Y), (G-Y) and (B-Y) chrominance map memories would have simplified color matrixing circuitry 30, for example, and re-programming of the chrominance map memories could more readily adjust colorimetry to accommodate the use of color kinescopes with differing phosphor combinations. Problems with quantizing errors in color-difference signals may be more tractable using more than two chrominance map memories.

Figure 5:
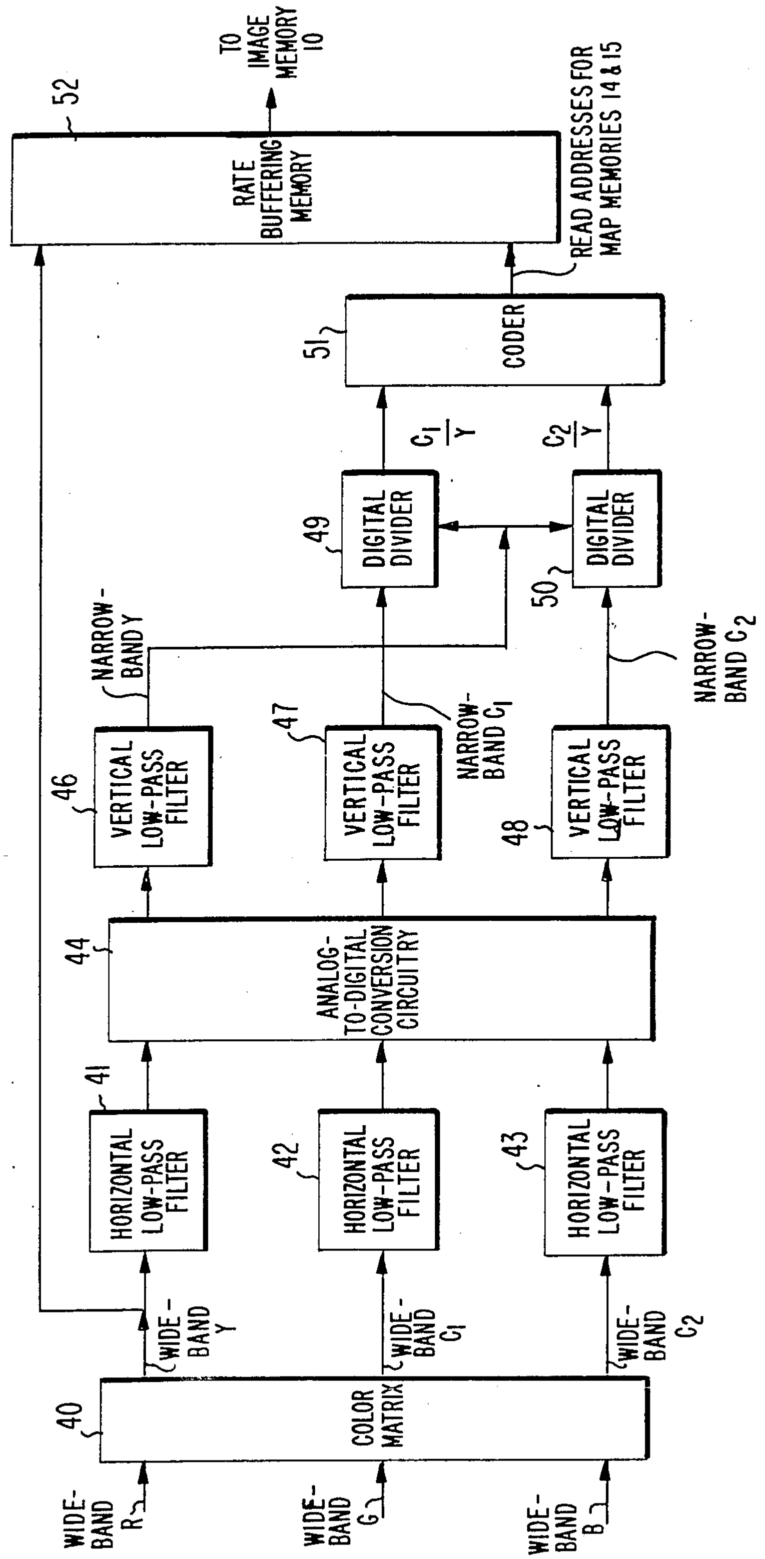
FIG. 5 is a block schematic diagram of apparatus for generating descriptions of color images for the FIG. 3 display processor.

FIG. 5 is referred to for explaining in further detail the preferred way to generate image-descriptive data for use in the FIG. 3 display processor, proceeding from wideband analog red, green and blue signals, as supplied from a television camera, for example. Color matrixing circuitry 40 responds to these signals to generate wideband analog Y, $C_1$ and $C_2$ signals. These signals are filtered to develop narrow-bandwidth Y, $C_1$ and $C_2$ signals from which the $C_1/Y$ and $C_2/Y$ signals may be formed by division processes in which aliasing is kept minimal.

Towards this goal, the wideband analog Y, $C_1$ and $C_2$ signals are passed through low-pass filters 41, 42 and 43 respectively to reduce their bandwidth in the direction of horizontal scan. The horizontal filtering is done prior to the Y, $C_1$ and $C_2$ being converted to sample-data form, avoiding any aliasing associated with the filtering being done on a sample-data basis. Analog-to-digital conversion circuitry 44 samples and digitizes each of the narrowband Y, $C_1$ and $C_2$ signals that are respectively supplied from filters 41, 42 and 43. The sampling rate used in conversion circuitry 44 is normally chosen to be lower than required for wide-bandwidth Y, $C_1$ and $C_2$ signals. Low-pass filtering of the digitized Y, $C_1$ and $C_2$ signals in the vertical direction is carried forward in transversal digital low-pass filters 46, 47 and 48 respectively.

The sampled-data narrowband $C_1$ signal from filter 47 is divided by the sampled-data narrowband Y signal from filter 46 in digital divider circuitry 49 to generate a sampled-data narrowband $C_1/Y$ signal. Similarly, the sampled-data narrowband $C_2$ signal from filter 48 is divided by the sampled-data narrowband Y signal from filter 46 in digital divider circuitry 50 to generate a sampled-data narrowband $C_2/Y$ signal. These $C_1/Y$ and $C_2/Y$ signals are encoded to read addresses for the $C_1/Y$ map memory 14 and for the $C_2/Y$ map memory 15 in a coder 51. The lines of $C_1/Y$ and $C_2/Y$ signal are normally subsampled, which can be done at coder 51 inputs. Alternatively, one may arrange for subsampling to be done at the outputs of filters 46–48 and for rate buffering to be employed to supply dividers 49 and 50 input sampled-data at a lower uniform rate.

Coder 51 may be a table-lookup memory if fixed chroma codes are used to address map memories 14 and 15, or a statistical coder may be employed. Where statistical coding is done in coder 51, the coder will also periodically transmit data for reprogramming map memories 14 and 15, which data will be time-division-multiplexed with the successions of map memory read addresses transmitted to describe chrominance scan lines. Coder 51 output and wideband luminance from color matrixing circuitry 40 are supplied to write a rate buffer memory 52, which reads to the VRAM containing image memory 10. Rate buffering memory 52 accommodates the need to write data serially into the VRAM, although the data as originally generated is parallelly supplied. Rate buffering memory 52 additionally accommodates any differential delay between coder 51 output and the wideband luminance from color matrixing circuitry 40, as is required to compensate for delay in coder 51.

The digital dividers 49 and 50 may each employ the following construction, in line with standard digital divider practice. Narrow-band Y signal is applied to a memory storing a reciprocal look-up table to generate narrow-band (1/Y) signal, which is expressed as a number of binary places offset and a continuing binary fraction with a ONE in its most significant place. The continuing binary fraction is supplied as the multiplier for a digital multiplier receiving the narrow-band $C_1$ or $C_2$ signal as its multiplicand. The product is then shifted towards less significance by the number of bit places indicated as suitable offset by the reciprocal look-up table, which is usually followed by round-off. Y always being positive, the signs of $C_1$ and $C_2$ may be carried around the digital divider circuitry thusfar described to determine the sign of the quotient. Circuitry can be provided for forcing $C_1/Y$ and $C_2/Y$ not to exceed unity in the limits where Y tends to be close to zero.

When the FIG. 5 and FIG. 3 apparatuses are operated in conjunction with each other, the $C_1$ and $C_2$ signals recovered as products by multipliers 28 and 29 will depart from the $C_1$ and $C_2$ signals supplied as quotients by dividers 49 and 50. These departures arise because of amplitude quantization errors introduced by coder 51 and by the decoding done in map memories 14 and 15. These errors can be reduced to an acceptable level by including enough entries in map memories 14 and 15 and by spacing the color values stored therein by a specified number of JNDs in chromaticity.

What is claimed is:

1. A display processor for color video signals comprising:

first and second map memories addressed in parallel, for storing values of first and second chrominance-only signals respectively, each normalized respective to luminance;

means for synchronously providing during display line trace intervals first and second streams of data, the first stream of data being descriptive of display luminosity fully sampled at a given spatial density, and the second stream of data being descriptive of display chromaticity fully sampled at said given spatial density and being applied as read addresses to said first and second map memories;

means responsive to said first stream of data for supplying a luminance-only signal;

means responsive to the read-outs of said first and second map memories for supplying first and second color-difference signals normalized respective to luminance;

means for multiplying, by said luminance signal, each of said first and second color-difference signals normalized respective to luminance, thereby to generate first and second color-difference signals; and color matrixing circuitry for linearly combining these said first and second color-difference signals with said luminance-only signal for generating video drive signals in each of three primary colors.

2. A display processor as set forth in claim 1 including:

means for re-writing at least portions of said first and second map memories during display line retrace intervals.

3. A display processor as set forth in claim 1 wherein said means responsive to said first stream of data for supplying a luminance signal includes:

a third map memory responsive to said first stream of data being applied as its read address for storing values of said luminance-only signal.

4. A display processor as set forth in claim 3 wherein said means for multiplying comprises:

first and second analog multipliers; and wherein said means responsive to said first stream of data for supplying a luminance signal includes:

first digital-to-analog converting means for converting digital values of said luminance-only signal supplied from said third map memory to luminance-only signal in analog form, which is supplied to said color matrixing circuitry and applied to said first and second analog multipliers as their multiplier signals; and wherein said means responsive to the read-outs of said first and second map memories for supplying first and second color-difference signals normalized respective to luminance includes:

second digital-to-analog converting means for converting the read-out of said first map memory to said first color-difference signal normalized respective to luminance, in analog form, for application to said first analog multiplier as its multiplicand signal, causing said first analog multiplier to supply said first color-difference signal in analog form as its output product applied to said color matrixing circuitry; and wherein said means responsive to the read-outs of said first and second map memories for supplying first and second color-difference signals normalized respective to luminance includes:

third digital-to-analog converting means for converting the read-out of said second map memory to said second color-difference signal normalized respective to luminance, in analog form, for application to said second analog multiplier as its multiplicand signal, causing said second analog multiplier to supply said second color-difference signal in analog form as its output product applied to said color matrixing circuitry.

5. A display processor as set forth in claim 1 wherein said means for multiplying comprises:

first and second analog multipliers; and wherein said means responsive to said first stream of data for supplying a luminance signal includes:

first digital-to-analog converting means for converting digital values of said first stream of data to luminance-only signal in analog form, which is supplied to said color matrixing circuitry and applied to said first and second analog multipliers as their multiplier signals; and wherein said means responsive to the read-outs of said first and second map memories for supplying first and second color-difference signals normalized respective to luminance includes:

second digital-to-analog converting means for converting the read-out of said first map memory to said first color-difference signal normalized respective to luminance, in analog form, for application to said first analog multiplier as its multiplicand signal, causing said first analog multiplier to supply said first color-difference signal in analog form as its output product applied to said color matrixing circuitry; and wherein said means responsive to the read-outs of said first and second map memories for supplying first and second color-difference signals normalized respective to luminance includes:

third digital-to-analog converting means for converting the read-out of said second map memory to said second color-difference signal normalized respective to luminance, in analog form, for application to said second analog multiplier as its multiplicand signal, causing said second analog multiplier to supply said second color-difference signal in analog form as its output product applied to said color matrixing circuitry.

6. A display processor for color video signals comprising:

first and second map memories addressed in parallel, for storing values of first and second chrominance-only signals respectively, each normalized respective to luminance;

means for providing first and second streams of data, the first stream of data being descriptive of display luminosity fully sampled at a given spatial density, and the second stream of data being descriptive of display chromaticity subsampled at said given spatial density and being applied as read addresses to said first and second map memories;

means responsive to said first stream of data for supplying a full-spatial-bandwidth luminance-only signal;

means responsive to the read-outs of said first and second map memories for sampling first and second color-difference signals normalized respective to luminance and restricted to less than full spatial bandwidth as compared to said full-spatial-bandwidth luminance-only signal;

means for low-pass spatially filtering said luminance-only signal to the same spatial bandwidth as said color-difference signals normalized respective to luminance, for generating a multiplier signal;

differential delay means for temporally aligning said full-spatial bandwidth luminance signal with said multiplier signal and said color-difference signals normalized respective to luminance;

means for multiplying by said multiplier signal each of said first and second color-difference signals normalized respective to luminance, thereby to generate first and second color-difference signals; and means for linearly combining these said first and second color-difference signals with said temporally aligned full-spatial-bandwidth luminance-only signal for generating video drive signals in each of three primary colors.

7. A display processor as set forth in claim 6 including:

means for re-writing at least portions of said first and second map memories during display line retrace intervals.

8. A display processor as set forth in claim 6 wherein said means responsive to said second stream of data for supplying a luminance signal includes:

a third map memory responsive to said first stream of data being applied as its read address for storing values of said luminance-only signal.

9. A display processor as set forth in claim 8 wherein said means for multiplying comprises:

first and second analog multipliers; wherein said means responsive to said first stream of data for supplying a luminance signal includes:

first digital-to-analog converting means for converting digital values of said luminance-only signal supplied from said third map memory to luminance-only signal in analog form, which is supplied to said color matrixing circuitry and applied to said first and second analog multipliers as their multiplier signals; and wherein said means responsive to the read-outs of said first and second map memories for supplying first and second color-difference signals normalized respective to luminance includes:

second digital-to-analog converting means for converting the read-out of said first map memory to said first color-difference signal normalized respective to luminance, in analog form, for application to said first analog multiplier as its multiplicand signal, causing said first analog multiplier to supply said first color-difference signal in analog form as its output product applied to said color matrixing circuitry; and wherein said means responsive to the read-outs of said first and second map memories for supplying first and second color-difference signals normalized respective to luminance includes:

third digital-to-analog converting means for converting the read-out of said second map memory to said second color-difference signal normalized respective to luminance, in analog form, for application to said second analog multiplier as its multiplicand signal, causing said second analog multiplier to supply said second color-difference signal in analog form as its output product applied to said color matrixing circuitry.

10. A display processor as set forth in claim 6 wherein said means for multiplying comprises:

first and second analog multipliers; wherein said means responsive to said first stream of data for supplying a luminance signal includes:

first digital-to-analog converting means for converting digital values of said first stream of data to luminance-only signal in analog form, which is supplied to said color matrixing circuitry and applied to said first and second analog multipliers as their multiplier signals; and wherein said means responsive to the read-outs of said first and second map memories for supplying first and second color-difference signals normalized respective to luminance includes:

second digital-to-analog converting means for converting the read-out of said first map memory to said first color-difference signal normalized respective to luminance, in analog form, for application to said first analog multiplier as its multiplicand signal, causing said first analog multiplier to supply said first color-difference signal in analog form as its output product applied to said color matrixing circuitry; and wherein said means responsive to the read-outs of said first and second map memories for supplying first and second color-difference signals normalized respective to luminance includes:

third digital-to-analog converting means for converting the read-out of said second map memory to said second color-difference signal normalized respective to luminance, in analog form, for application to said second analog multiplier as its multiplicand signal, causing said second analog multiplier to supply said second color-difference signal in analog form as its output product applied to said color matrixing circuitry.

11. Apparatus for generating signals descriptive of color imagery comprising:

means for supplying a relatively wideband luminance signal;

means for supplying first and second color difference signals having narrower spatial bandwidths than said luminance signal, in all directions;

means for filtering said luminance signal to the same spatial bandwidth as each of said color difference signals;

means for dividing each of said color-difference signals by luminance signal filtered to the same narrower spatial bandwidth as its own; and means responsive to the resulting quotients for generating chrominance-descriptive codes to accompany said relatively wideband luminance signal, as said signals descriptive of color imagery.

* * * * *